United States Patent
Mandell et al.

(10) Patent No.: US 6,940,896 B2
(45) Date of Patent: Sep. 6, 2005

(54) METHOD FOR SEAMLESSLY COMBINING ADJACENT FILTERS IN A FREQUENCY CHANNELIZER

(75) Inventors: Michael I. Mandell, Los Angeles, CA (US); Arnold L. Berman, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 857 days.

(21) Appl. No.: 09/817,402

(22) Filed: Mar. 26, 2001

(65) Prior Publication Data

US 2002/0181630 A1 Dec. 5, 2002

(51) Int. Cl.$^7$ ................................................ H04B 1/10
(52) U.S. Cl. ...................... 375/150; 375/350; 375/229; 708/300; 708/301
(58) Field of Search ............................... 375/229, 230, 375/232.235, 350; 708/322, 323, 300, 301, 306, 319; 370/210

(56) References Cited

U.S. PATENT DOCUMENTS

| | | | | |
|---|---|---|---|---|
| 5,299,192 A | * | 3/1994 | Guo et al. ................... | 370/210 |
| 5,436,940 A | * | 7/1995 | Nguyen ....................... | 375/240 |
| 5,926,513 A | * | 7/1999 | Suominen et al. .......... | 375/346 |
| 5,943,642 A | * | 8/1999 | Choi ........................... | 702/197 |
| 6,077,303 A | | 6/2000 | Mandell et al. | |
| 6,307,897 B1 | * | 10/2001 | Ohta et al. .................. | 375/316 |

\* cited by examiner

Primary Examiner—Phuong Phu
(74) Attorney, Agent, or Firm—Harness Dickey & Pierce, P.L.C.

(57) ABSTRACT

An improved method is provided for seamlessly combining adjacent subchannels in a signal processing system. Each adjacent subchannel is defined to include a first and a second linear phase digital filter, where the filters are implemented using digital circuitry having a plurality of registers. Prior to summing the two adjacent channels, a delay is introduced into one of the two filters in each of the subchannels, such that the delay is equal to the delay associated with one register in the digital circuitry. The two adjacent subchannels are then combined to form a composite channel that exhibits linear phase.

4 Claims, 3 Drawing Sheets

US 6,940,896 B2

METHOD FOR SEAMLESSLY COMBINING ADJACENT FILTERS IN A FREQUENCY CHANNELIZER

TECHNICAL FIELD

The present invention relates generally to multi-channel frequency channelizers, and more particularly to a method for seamlessly combining adjacent filters in a multi-channel frequency channelizer.

BACKGROUND OF THE INVENTION

Building analog frequency channelizers is well known in the art. However, as the number of channels in the channelizer increases, analog realizations become increasingly complex.

Digitally realized channelizers are also well known in the art. When building a digital frequency channelizer, it is often advantageous to be able to seamlessly combine adjacent channels to form a larger composite signal path. Polyphase decomposition is a known technique for realizing a digital frequency channelizer. Unfortunately, this technique does not necessarily result in a successful combination of adjacent channels. In particular, the resultant composite channel may not be in linear phase.

It is, therefore, a principal object of the present invention to provide a method for seamlessly combining adjacent filters to form a composite channel that exhibits linear phase.

SUMMARY OF THE INVENTION

The above objects are provided by an improved method for seamlessly combining adjacent subchannels in a signal processing system. The invention results in a composite channel that exhibits linear phase.

In a first aspect of the invention, each adjacent subchannel is defined to include a first and a second linear phase digital filter, where the filters are implemented using digital circuitry having a plurality of registers. Prior to summing the two adjacent channels, a delay is introduced into one of the two filters in each of the subchannels, such that the delay is equal to the delay associated with one register in the digital circuitry. The two adjacent subchannels are then combined to form a composite channel that exhibits linear phase.

In another aspect of the invention, a method is provided for implementing a digital multi-channel frequency channelizer. The method includes the steps of determining a polynominal form that is indicative of a prototype filter; computing a polyphase decomposition for the prototype filter in order to derive at least two adjacent filter channels, where each adjacent filter channel includes two linear phase digital filters which are implemented in digital circuitry having a plurality of registers; adding a delay to one of the two digital filters in each of the adjacent filter channels, such that the delay is equal to the delay associated with one register in the digital circuitry; and combining the two adjacent filter channels, thereby forming a frequency channelizer having linear phase.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
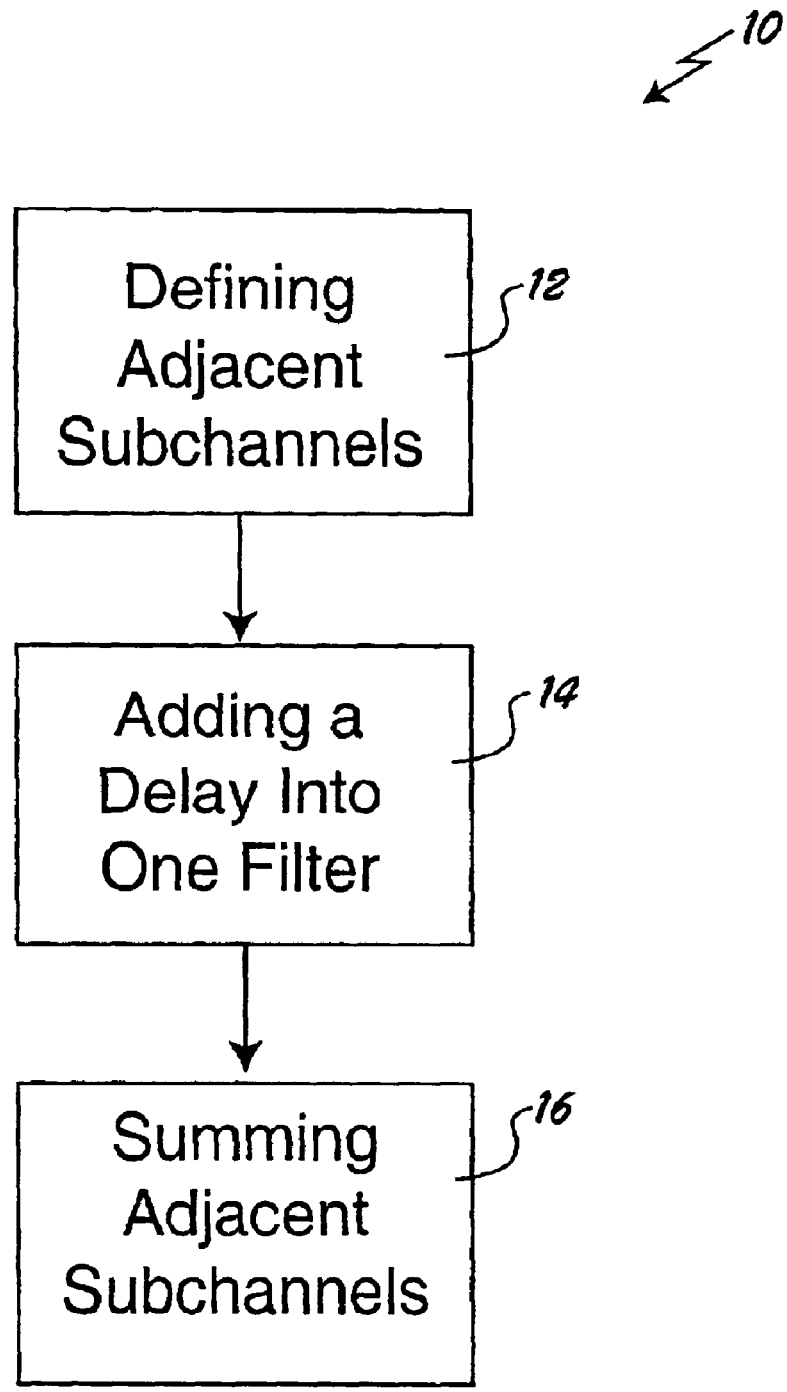
FIG. 1 is a flowchart illustrating a method for combining adjacent subchannels in a signal processing system in accordance with the present invention.

FIG. 1 illustrates a method for combining adjacent subchannels 10 in accordance with the present invention. Although the invention is not limited thereto, this method for combining adjacent subchannels is particularly applicable to subchannels having two digital filters in cascade form. In general, summing two linear phase filters or two subchannels comprised of linear phase filters does not necessarily result in a composite channel having linear phase. However, as will be more fully described below, a delay may be introduced into one of the filters in each subchannel, such that the resultant composite channel will always exhibit linear phase.

Figure 2:
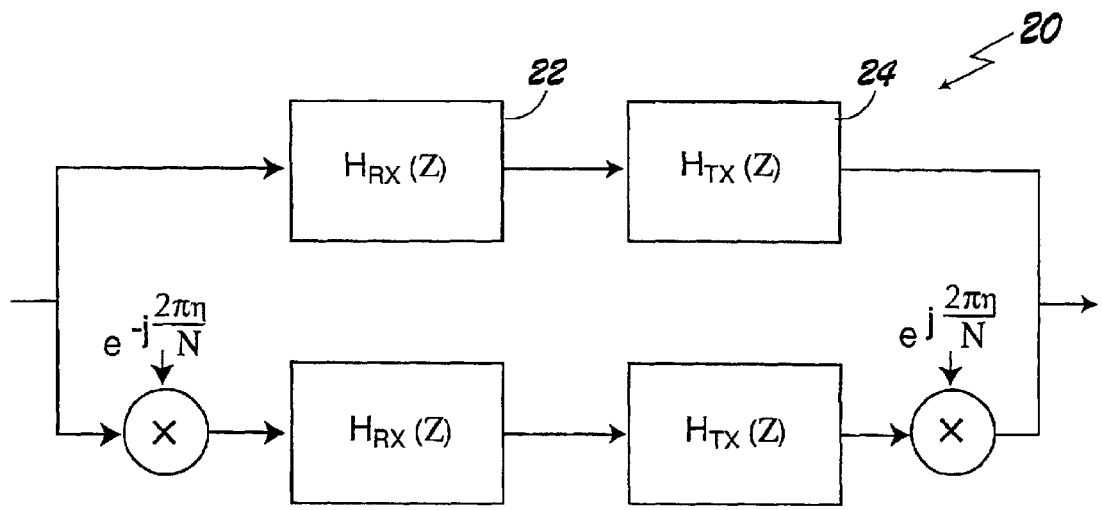
FIG. 2 is a block diagram of a composite channel formed by adding two adjacent narrowband subchannels.

A composite channel 20 formed by adding two adjacent narrowband subchannels is shown in FIG. 2. Each subchannel is further defined to include a digital receive filter 22 and a digital transmit filter 24 in cascade form. More specifically, the two digital filters may be defined as two finite impulse response (FIR) filters that exhibit linear phase. While the following description is provided with reference to FIR filters, it is envisioned that the broader aspects of the present invention may be applicable to other types of digital filters that exhibit linear phase. In addition, it is envisioned that the present invention may be extended as a technique for combining three or more adjacent subchannels.

The digital receive filter, $H_{RX}(Z)$, can be expressed as $$H_{RX}(Z) = \sum_{k=0}^{L-1} h_k Z^{-k},$$

where L is the number of taps and is a multiple of the FFT size N, and the tap values $h_k$ have the symmetry property that $h_{L-1-k} = h_k$, (k=0,1,2, . . . , L−1). The digital transmit filter, $H_{TX}(Z)$, is then defined to be $$H_{TX}(Z) = Z^{-1} H_{RX}(Z).$$

The factor of $Z^{-1}$ in this equation represents a delay that is introduced into the filter. Although the delay is being introduced into the transmit filter, it is also within the scope of the present invention to introduce the delay into the receive filter. The delay factor of $Z^{-1}$ is carefully chosen so that the combination of the two adjacent subchannels results in a composite channel having linear phase. In particular, the delay is defined to be equal to the delay associated with a register in the digital circuitry implementing the filters. If the factor of $Z^{-1}$ were left out of this equation, then the resultant composite channel would not necessarily exhibit linear phase.

Next, the equivalent response for the subchannel, $H_{eq}(Z)$, is defined to be the cascade of the receive and transmit FIR filters as follows:

$$H_{eq}(Z) = H_{RX}(Z) H_{TX}(Z) = Z^{-1} H_{RX}^2(Z).$$

The equivalent response, $H_{eq}$, can be expressed as a function of angular frequency, w, by substituting $Z = e^{jw}$ as shown below $$H_{eq}(W) = e^{jw}H_{RX}^2(w).$$

Figure 3:
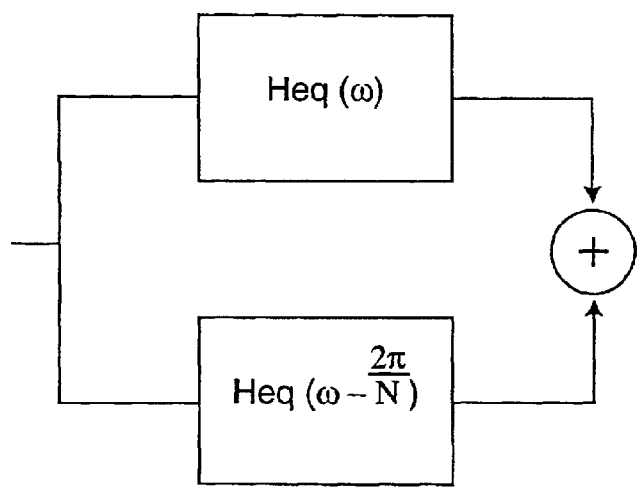
FIG. 3 is a block diagram of an equivalent composite channel in accordance with the present invention.

Accordingly, the composite channel formed by adding two adjacent narrowband subchannels can be redrawn as shown in FIG. 3. In accordance with the present invention, we must show that the composite channel, $$H_{eq}(w) + H_{eq}\left(w - \frac{2\pi}{N}\right),$$

exhibits linear phase. To do so, a mathematical proof is set forth below.

First, the digital receive FIR filter, $H_{RX}(W)$, can be expressed as a magnitude and phase response as follows $$H_{RX}(w) = \sum_{k=0}^{L-1} h_k e^{-jwk},$$

$$= \sum_{k=0}^{\frac{L}{2}-1} h_k e^{-jwk} + \sum_{k=\frac{L}{2}}^{L-1} h_k e^{-jwk},$$

$$= \sum_{k=0}^{\frac{L}{2}-1} h_k e^{-jwk} + \sum_{k=0}^{\frac{L}{2}-1} h_{L-1-k} e^{-jw(L-1-k)},$$

$$= \sum_{k=0}^{\frac{L}{2}-1} h_k [e^{-jwk} + e^{-jw(L-1-k)}],$$

$$= \sum_{k=0}^{\frac{L}{2}-1} h_k e^{-jw\frac{L-1}{2}} \left[ e^{-jw\left(k-\frac{L-1}{2}\right)} + e^{-jw\left(\frac{L-1}{2}-k\right)} \right],$$

$$= e^{-jw\frac{L-1}{2}} \sum_{k=0}^{\frac{L}{2}-1} 2h_k \cos\left(w\left(k - \frac{L-1}{2}\right)\right).$$

Thus, the digital receive filter may be defined as $$H_{RX}(w) = e^{-jw\frac{L-1}{2}} R(w),$$

where $$R(w) = \sum_{k=0}^{\frac{L}{2}-1} 2h_k \cos\left(w\left(k - \frac{L-1}{2}\right)\right).$$

It is noteworthy that $R(w)$ is a real value. The response for a first subchannel, $H_{eq}(w)$, can now be written as $$H_{eq}(w) = e^{-jw} H_{RX}^2(w),$$

$$= e^{-jw}\left[e^{-jw\frac{L-1}{2}} R(w)\right]^2$$

$$= e^{-jwL} R^2(w)$$

Similarly, the frequency shifted response of an adjacent subchannel, $$H_{eq} = \left(w - \frac{2\pi}{N}\right),$$

can now be written as $$H_{eq} = \left(w - \frac{2\pi}{N}\right) = e^{-j\left(w-\frac{2\pi}{N}\right)L} R^2\left(w - \frac{2\pi}{N}\right)$$

$$= e^{-jwL} e^{j\frac{2\pi L}{N}} R^2\left(w - \frac{2\pi}{N}\right)$$

Since L is a multiple of N, then $$e^{j\frac{2\pi L}{N}} = 1$$

which in turn yields $$H_{eq}\left(w - \frac{2\pi}{N}\right) = e^{-jwL} R^2\left(w - \frac{2\pi}{N}\right).$$

if we combine the two adjacent subchannels, the overall response of the composite channel can be characterized as follows $$H_{eq}(w) + H_{eq}\left(w - \frac{2\pi}{N}\right) = e^{-jwL}\left[R^2(w) + R^2\left(w - \frac{2\pi}{N}\right)\right].$$

In other words, the composite channel exhibit linear phase.

In practice, the receive FIR filter is first implemented using digital circuitry. In a preferred embodiment, a FIR filter is realized using the well known Parks-McClellan design technique. However, it is envisioned that other filter design techniques may be used to realize a linear phase FIR filter, including (but not limited to) the windowing technique, the frequency-sampling technique, and the Chebyshev approximation technique. The transmit FIR filter is implemented by duplicating the receive FIR filter. As will be apparent to one skilled in the art, each of the digital filters are implemented in digital circuitry having one or more registers. The delay is then introduced into transmit FIR filter, such that the delay is equal to the delay that is associated with one register in the digital circuitry. Lastly, adjacent subchannels are summed, thereby forming a composite channel having linear phase.

Although the present invention is not limited thereto, an exemplary use would be in building a digital frequency channelizer. An exemplary digital channelizer may filter a 32 MHz input signal into 32 1 MHz signals. One way to realize such a filter is to build 32 separate filters. Unfortunately, this is not an efficient implementation of a frequency channelizer. Alternatively, a polyphase filter-bank is another known technique for realizing a digital frequency channelizer. However, this technique does not necessarily result in a successful combination of adjacent subchannels.

Figure 4:
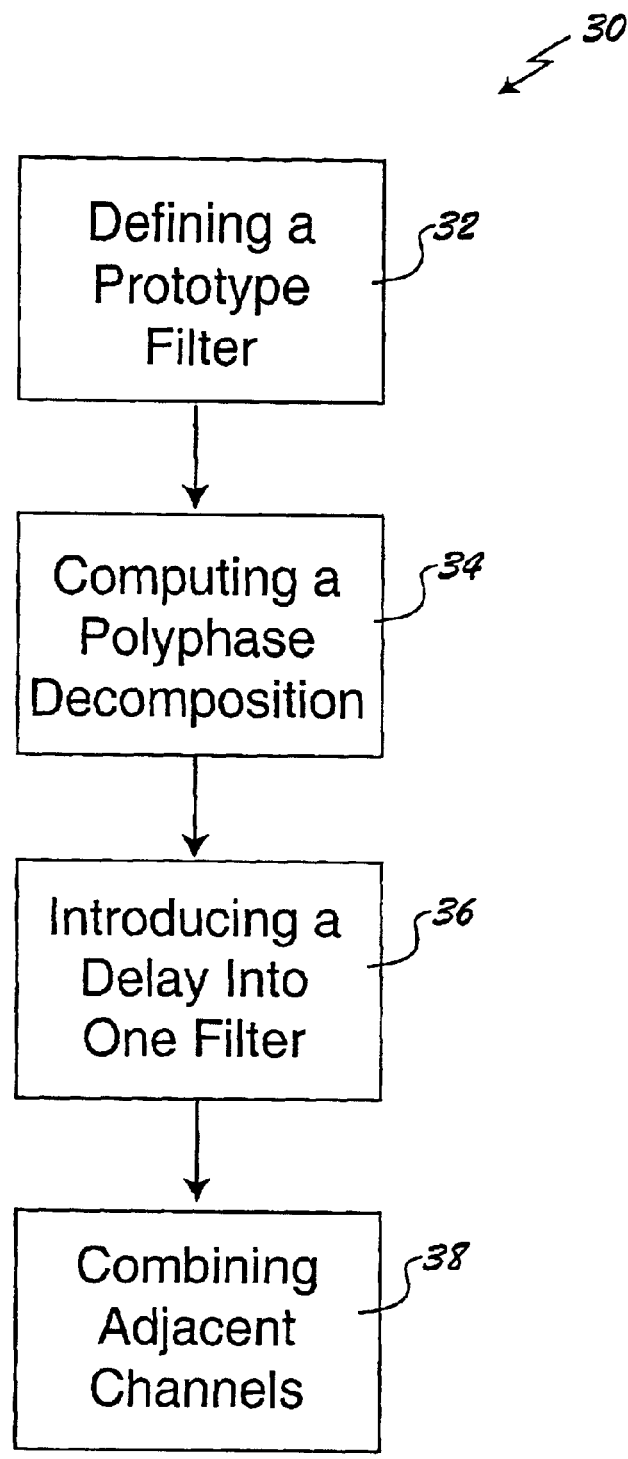
FIG. 4 is a flowchart illustrating a method for implementing a digital frequency channelizer in accordance with the present invention.

In accordance with the present invention, a method for implementing a digital frequency channelizer 30 having linear phase is shown in FIG. 4. First, a single digital filter (e.g., having 1 MHz bandwidth) is realized, as indicated at step 32, using previously described design techniques. For illustration purposes, the resulting filter is defined in a polynominal form having 96 taps. As will be apparent to one skilled in the art, the number of taps is a multiple of the filter bank size. This filter may be referred to as the prototype filter.

Next, the polyphase decomposition is computed for the prototype filter as indicated at step 34. Polyphase decomposition is a known technique which is used to define thirty-two separate filters each having 3 tap values. These thirty-two filters are commonly referred to as the polyphase components of the prototype filter and serve as the basis for the channelizer. One skilled in the art will readily recognize that two cascaded filters may be used to implement the one defined filter in each subchannel of the channelizer. In accordance with the present invention, a delay is then introduced, as indicated at step 36, into one of the filters in each subchannel. Lastly, the adjacent subchannels are recombined, as indicated at step 38, to form a digital frequency channelizer having linear phase.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A method for implementing a digital multi-channel frequency channelizer, comprising the steps of:

determining a polynominal form that is indicative of a prototype filter;

computing a polyphase decomposition for the prototype filter in order to derive at least two adjacent filter channels, where each adjacent filter channel includes two linear phase digital filters which are implemented in digital circuitry having a plurality of registers;

adding a delay to one of the two digital filters in each of the adjacent filter channels, such that the delay is equal to the delay associated with one register in the digital circuitry; and combining the two adjacent filter channels, thereby forming a frequency channelizer having linear phase.

2. The method of claim 1 the step of determining a polynominal form further comprises defining the prototype filter as a finite impulse response (FIR) filter.

3. The method of claim 1 wherein the step of determining a polynominal form further comprises using a Parks-McClellan design technique to realize the prototype filter.

4. The method of claim 1 wherein the step of computing a polyphase decomposition further comprises configuring the two linear phase digital filters in a cascade form.

\* \* \* \* \*